INVENTORS
ROBERT MONNIER
PHILIPPE GRANDJEAN
BY
Brumbaugh, Free, Graser & Donohue
THEIR ATTORNEYS

United States Patent Office 3,442,622
Patented May 6, 1969

3,442,622
REFINING OF SILICON
Robert Monnier and Philippe Grandjean, Geneva, Switzerland, assignors to The General Trustee Company, Inc., Geneva, Switzerland
Continuation-in-part of application Ser. No. 478,719, Aug. 10, 1965. This application May 8, 1968, Ser. No. 727,655
Claims priority, application Switzerland, Sept. 15, 1964, 11,990/64
Int. Cl. C01b 33/02
U.S. Cl. 23—223.5                     5 Claims

ABSTRACT OF THE DISCLOSURE

A process of refining silicon which involves alternatively subjecting molten silicon to treatment with a wet atmosphere of an inert gas and subjecting molten silicon to treatment in vacuum and repeating these treatments for a total of at least about fourteen times in order to remove essentially completely elements of the third and fifth columns of the periodic table.

---

Figure 1:
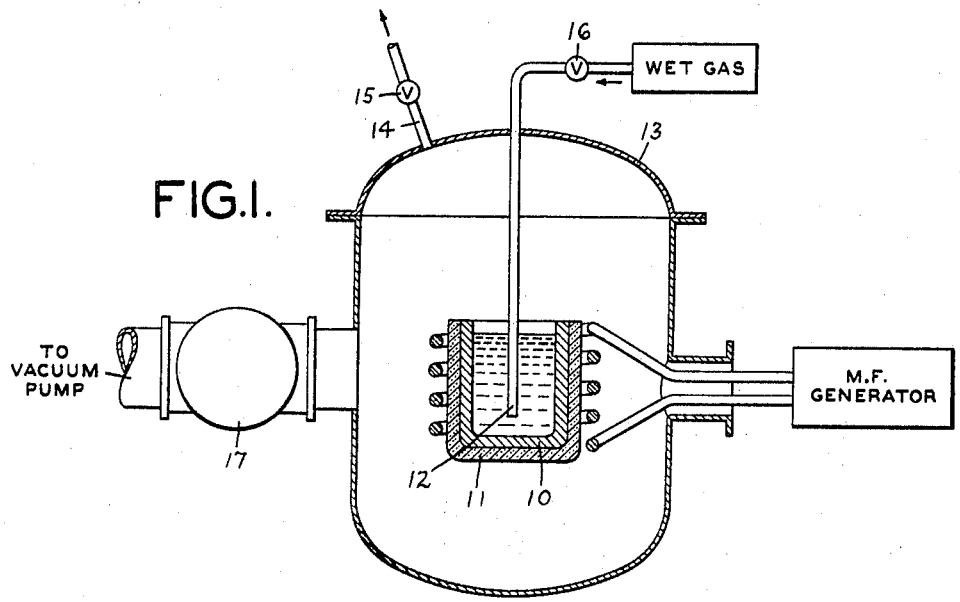

This application is a continuation-in-part of our copending U.S. application Ser. No. 478,719, filed Aug. 10, 1965, and now abandoned.

This invention relates to the purification of silicon and particularly the separation and removal of elements of the 3rd and 5th columns of the periodic table from silicon.

It is recognized that silicon produced electrochemically or otherwise contains impurities of various types usually including boron, phosphorus, arsenic and antimony. It is recognized that small amounts of elements of the 3rd column of the periodic table, such as for example, boron, introduce a deficiency of electrons into the silicon crystal structure and produce P-type silicon. Similarly it is also known that small amounts of the elements of the 5th column of the periodic table such as phosphorus, antimony and arsenic introduce in the crystal lattice an excess of electrons and product N-type silicon. However, excessive amounts of these materials can be and are detrimental to silicon if it is to be used as a semi-conductor.

A great many different methods and apparatus have been provided for reducing the amount of impurities in silicon, including zone melting, single crystal formation and the like. However, boron and some elements of the 5th column especially those referred to above can be eliminated only with difficulty and not completely, by the zone-melting technique.

It has been suggested that boron present in silicon can be eliminated by treating silicon in a molten state with a wet atmosphere of an inert gas. The water in the gas combines with boron to form volatile boron compounds which are evolved from the silicon. Nevertheless, the wet atmosphere technique does not eliminate the boron efficiently and completely, especially when silicon contains some of the elements of the 5th column in addition to boron, which is usually the case.

It has been recognized heretofore also, that volatile elements of the 5th column can be removed from the molten silicon by treatment in vacuum but also in this case a total elimination of these elements is not possible by vacuum treatment alone especially in the presence of boron.

In accordance with the present invention, a process is provided whereby boron and elements of the 5th column can be completely eliminated from silicon or reduced to traces only, by alternating treatments of the molten silicon with a wet gas and vacuum. Such alternating treatments reduce the boron and 5th column elements alternately and thereby reduce the combined effects of these elements progressively so that by repetitive treatment it is possible to remove boron and the elements of the 5th column essentially completely.

The process according to the invention has optimum benefits when combined with zone-melting for the elimination of the impurities having a favorable coefficient of segregation and do not have to be removed by treatment in wet gas or by vacuum. The process can be carried out before or after refining by zone-melting, but it is particularly satisfactory to carry it out simultaneously with zone-melting or zone-refining. The zone-melting passes can be carried out in either a horizontal or vertical apparatus for zone-refining.

When zone-melting and wet gas and vacuum treatments are combined, the silicon rod must be in an enclosure preferably made of quartz, in which it is possible to circulate gas or apply a vacuum.

If the process set forth in the invention is carried out before or after zone-melting or without refining by zone-melting, any apparatus which allows treatment of liquid substances at high temperatures by wet gas or vacuum, can be used. Among these, one can mention the following apparatus which gives the best results: a vacuum furnace with medium frequency heating with internal inductor, a vacuum furnace with high frequency heating with external inductor and quartz room. The best materials used for the crucibles are impervious carbon and graphite or silicon carbide; it is also possible to work with quartz crucibles, but those have to be placed in carbon or graphite crucible so that they can be heated directly by passage of electric current or by induction.

The moist gas is preferably hydrogen, having a partial pressure of water vapor between 4 and 25 mm. of mercury. Argon, helium or other gases inert to silicon can also be used as a carrier for the water vapor.

Figure 2:
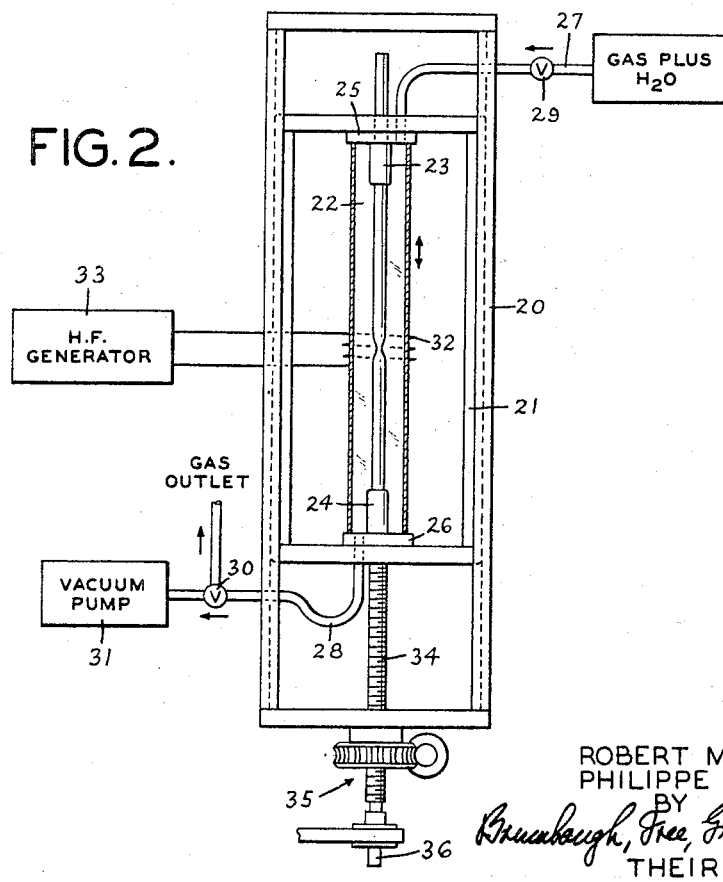

For a better understanding of the present invention, reference may be had to the accompanying drawings, in which:

FIGURE 1 is a schematic illustration of a suitable furnace and crucible for practicing the invention; and FIGURE 2 is a schematic front elevational view of a zone-melting apparatus suitable for practicing the invention.

As shown in FIGURE 1, silicon of a purity of about 99.9% is introduced into a silica crucible 10 which is placed in a graphite crucible 11 adapted to be heated by medium frequency induction. A silica pipe or conduit 12, which is dipped in the silicon when it is fused, is connected to a source of wet gas with a partial pressure between 4 and 25 mm. of mercury. The cover 13 of the vacuum apparatus is provided with another pipe 14 to be vented to atmosphere or to gas collector as may be desired. The pipes 12 and 14 are provided with valves 15 and 16.

In a typical operation, the silicon is melted in the crucible and subjected to alternate treatments with vacuum and bubbling wet gas therethrough. If the silicon is of the N-type, due to a preponderance of the elements of the 5th column, the valves 15 and 16 are closed and the valve 17 is opened to connect the furnace to the vacuum pump, and a vacuum of about $10^{-3}$ to $10^{-4}$ mm. of mercury is drawn in the chamber where the crucible containing silicon is placed to eliminate partially the volatile elements of the 5th column from the silicon. In so doing, the N-type silicon is converted to P-type because of the partial removal of the 5th column elements and the preponderance of boron. At this time, the valve 17 is closed to disconnect the crucible from the vacuum pump, and the valves 15 and 16 are opened to introduce wet gas into the crucible 10 and bubble the gas through the molten silicon therein. This bubbling operation reduces the boron content by forming probably volatile boron compounds which are evolved and reconverts the silicon to P-type. This sequence is repeated until the desired purity and resistivity of the silicon are obtained.

FIGURE 2 illustraates another apparatus and method of treating silicon. This apparatus is a typical zone-melting apparatus, including a fixed slide frame 20 having a carriage 21 movable vertically therein. Chucks 23 and 24 are mounted at the opposite ends of the carriage 21 for engaging and gripping the ends of a silicon rod. A quartz tube 22 also is mounted on the carriage concentric with the chucks and has its upper and lower ends sealed by means of gaskets 25 and 26 mounted of the upper and lower ends of the carriage. A gas inlet conduit 27 is connected to the upper end of the quartz tube, and a gas outlet tube 28 is connected to the lower end of the quartz tube. The gas inlet is provided with a shut-off valve 29, and the gas outlet is provided with a two-way valve 30 to enable the quartz tube to be connected selectively to a vacuum pump 31 or to a gas collector (not shown). Surrounding the quartz tube is an induction coil 32 supplied with a high frequency current by a high frequency generator 33 of known type to heat the silicon rod and melt a narrow zone of the rod.

The carriage 21 is moved axially by means of an electric motor (not shown) and a hollow threaded shaft 34 and gearing 35 to pass the silicon rod slowly through the induction coil and progressively melt a narrow zone along its length and thereby segregate the impurities at one end of the rod.

During the operation, the lower part of the silicon rod can be rotated by means of an electric motor (not shown) driving a shaft 36 on which the lower chuck 24 is mounted to stir the liquid silicon of the zone.

In accordance with the present invention and as described above, moist hydrogen gas is supplied to the quartz tube during the movement or passage of the silicon rod through the induction coil to reduce the amount of boron therein. During another pass of the rod through the induction coil, a vacuum is drawn in the quartz tube while the gas supply is shut off to reduce the amount of the 5th column elements in the silicon rod.

By way of typical example, a silicon rod 8 mm. in diameter and 300 mm. long and having a silicon purity of 99.9% is placed in the quartz tube 22 and subjected to zone-melting as described above and subjected to alternating treatments with a vacuum between about $10^{-3}$ and $10^{-4}$ mm. of mercury and with wet hydrogen having a water vapor pressure of 20 mm. of mercury.

Prior to the alternate treatments with wet hydrogen and vacuum, the rod is passed once through the induction coil at the speed of 0.5 mm. per minute to obtain a regular silicon rod. The silicon being treated was of N-type. After the initial pass, the rod was again passed through the induction zone at the speed of 0.5 mm. per minute while being subjected to the vacuum of $10^{-3}$ to $10^{-4}$ mm. of mercury. On the third pass the vacuum was released and wet hydrogen was supplied to the tube 22 through the inlet conduit 27, these treatments being alternated through a total of ten passes. The results of these passes with respect to the type of silicon present at the end of each pass and the average resistivity are indicated in the following table:

| No. of pass | Treatment | Obtained type | Average resistivity ohm-centimeter |
| --- | --- | --- | --- |
| 1 | Vacuum | N | 0.1 |
| 2 | do | P | 0.2 |
| 3 | Wet H₂ | N | 0.3 |
| 4 | Vacuum | P | 1.0 |
| 5 | Wet H₂ | N | 1.2 |
| 6 | Vacuum | P | 7 |
| 7 | Wet H₂ | N | 10 |
| 8 | Vacuum | P | 30 |
| 9 | Wet H₂ | N | 70 |
| 10 | Vacuum | P | 200 |

The P-type silicon produced by the ten passes had a satisfactory Hall effect and mobility. If the treatments had been continued further, the resistivity would have increased and the Hall effect and mobility would have improved still further.

Surprisingly, the alternate treatments described above enables the production of a much purer silicon having a greatly increased resistivity as compared with a single treatment with vacuum over a period of time equal to the sum of the periods 1, 2, 4, 6, 8 and 10 of the example given above and a single treatment with wet gas over a period equal to the sum of the periods 3, 5, 7 and 9 of the example.

A further typical example, also using the apparatus of FIG. 2, and illustrating the use of a total of at least about fourteen treatments, is as follows:

Raw material

Electrolytic silicon prepared by electro-refining

Electrolysis conditions

Electrolyte _____ Cryolite + 5% silica.
Anode _____ Cu-Si alloy (16% Si).
Cathode _____ graphite.
Temperature _____ 1000° C.
Current density _____ 30 a./dm.²

The silicon used in the Cu-Si alloy was prepared by direct electro-winning. The electrolyte was not submitted to the wet nitrogen treatment.

Crystal pulling and zone-refining

The silicon was melted in a commercial grade quartz crucible and a polycrystalline rod was pulled.

Dimensions of the rod:

Diameter _____ mm__ 10
Length _____ cm__ 33

This rod was submitted to purification by zone-floating and 14 passes were made in the following conditions:

Pass 1 in wet hydrogen (16° C.)—Speed 1 mm./minute.
Pass 2 in vacuum at 3.10⁻⁴ mm. Hg—Speed 1 mm./minute.
Pass 3 in wet hydrogen (11–13° C.)—Speed 1 mm./minute.
Pass 4 in vacuum at 3.10⁻⁴ mm. Hg—Speed 2 mm./minute.
Pass 5 in wet hydrogen (11–13° C.)—Speed 0.5 mm./minute.
Pass 6 in vacuum at 3.5.10⁻⁴ mm. Hg—Speed 0.5 mm./minute.
Pass 7 in wet hydrogen (11–13° C.)—Speed 0.5 mm./minute.
Pass 8 in wet hydrogen (11–13° C.)—Speed 0.5 mm./minute.
Pass 9 in vacuum at 1.10⁻⁴ mm. Hg—Speed 0.5 mm./minute.
Pass 10 in wet hydrogen (11–13° C.)—Speed 0.5 mm./minute.
Pass 11 in vacuum at 3.10⁻⁴ mm. Hg—Speed 0.5 mm./minute.
Pass 12 in wet hydrogen (11–13° C.)—Speed 0.5 mm./minute.
Pass 13 in wet hydrogen (11–13° C.)—Speed 0.5 mm./minute.
Pass 14 in vacuum at 3.10⁻⁴ mm. Hg—Speed 0.5 mm./minute.

The silicon rod was submitted to one more pass (15) in dry hydrogen for equalization of the diameter.

Characteristics of the rod

| | |
|---|---|
| Structure | Polycrystalline rod. |
| Form | Crystal pulled. |
| Resistivity | Average 300 ohm-cm. |
| Type | P. |
| Length | 29 cm. |
| Diameter | 10 mm. |

It will be understood that other techniques and apparatus can be used for melting silicon and treating the molten silicon with moist hydrogen and vacuum and that boron and 5th column elements can also be eliminated from either partially purified or relatively highly purified silicon by varying the extent of the refining of operation. Accordingly, the examples of the method and apparatus given herein should be considered as illustrative and not as limiting the scope of the invention as defined in the following claims.

What is claimed is:

1. A method of refining silicon comprising melting silicon containing at least one element of each of the third and fifth columns of the periodic table and subjecting the molten silicon to alternate purifying treatments of (1) contacting said molten silicon with a gas containing water vapor and (2) subjecting said molten silicon to a vacuum and repeating the alternate treatments for a total of at least about fourteen times until the elements of the third and fifth columns of the periodic table are essentially completely removed.

2. The method set forth in claim 1 in which a rod of said silicon is repeatedly zone melted progressively throughout its length and is alternately contacted with said gas and subjected to said vacuum during separate and successive zone meltings.

3. The method set forth in claim 1 in which said gas is selected from a group of gases inert to silicon in a molten state consisting of hydrogen, argon and helium.

4. The method set forth in claim 1 in which said molten silicon is subjected to a vacuum between about $10^{-3}$ and $10^{-4}$ mm. of mercury.

5. The method set forth in claim 1 in which said gas-containing water vapor is bubbled through said molten silicon.

References Cited

UNITED STATES PATENTS 2,901,325   8/1959   Theuerer   23—223.5

EDWARD STERN, *Primary Examiner.*

U.S. Cl. X.R.

148—1.6